United States Patent [19]

Takahashi et al.

[11] Patent Number: 5,076,153
[45] Date of Patent: Dec. 31, 1991

[54] AUTOMATIC BREAD-MAKING DEVICE

[75] Inventors: Yoshinori Takahashi, Nara; Jun Misaki, Shijonawate; Tsutomu Nishikawa, Higashiosaka; Yasuo Naoi, Hirakata; Toshinori Sasaki, Ikoma, all of Japan

[73] Assignee: Zojirushi Corporation, Osaka, Japan

[21] Appl. No.: 446,582

[22] Filed: Dec. 5, 1989

[30] Foreign Application Priority Data

Jan. 13, 1989 [JP] Japan .................................. 1-3218[U]

[51] Int. Cl.⁵ ............................................ A47J 27/00
[52] U.S. Cl. ........................................ 99/327; 99/332; 99/348; 99/357; 99/468; 366/98; 366/146; 366/601
[58] Field of Search ................. 99/348, 327, 331, 332, 99/352, 329 R, 467, 468, 483, 484, 357; 366/144–146, 149, 69, 98, 205, 314, 343, 601

[56] References Cited

U.S. PATENT DOCUMENTS

| | | | |
|---|---|---|---|
| 4,664,530 | 5/1987 | Kurome et al. | 366/205 |
| 4,762,057 | 8/1988 | Hirota et al. | 99/348 |
| 4,776,265 | 10/1988 | Ojima | 99/468 |
| 4,836,683 | 6/1989 | Aoyama | 366/98 |
| 4,903,587 | 2/1990 | Nagasaka et al. | 99/352 |
| 4,903,589 | 2/1990 | Aoyama | 366/145 |
| 4,951,559 | 8/1990 | Arao et al. | 99/468 |
| 4,957,040 | 9/1990 | Nakakura et al. | 99/331 |
| 4,984,512 | 1/1991 | Takahashi et al. | 99/348 |

FOREIGN PATENT DOCUMENTS 1123036 9/1956 France ................................ 366/314
1317414 12/1989 Japan .................................. 99/348

Primary Examiner—Timothy F. Simone
Attorney, Agent, or Firm—Jones, Tullar & Cooper

[57] ABSTRACT

An automatic bread-making device comprises a housing, a cooking vessel removably arranged therein and provided at its bottom with a rotating shaft, a kneading blade removably attached to the rotating shaft, and a driving means for rotating the kneading blade through the rotating shaft. The kneading blade is providing with at least one crescent-shaped projection at a wall surface of a bore for attachment of the blade to the rotating shaft, while the rotating shaft is provided at its upper portion with at least one groove extending in the direction parallel to a line which intersects the axis of the shaft to form a head with a figure similar to that of an opening formed between the inner wall of the bore and a free end of the projection. The kneading blade is attached to the rotating shaft so that the head of the rotating shaft is engaged with the projection of the blade when the head of the shaft is arranged in the bore of the blade. The device further comprises a sequence control system for controlling the driving means and heaters, and a coupling means between the rotating shaft and the driving shaft. During kneading, the driving shaft is rotated in such a manner that, when revolution of the blade is to be reversed, the driving shaft is reversely driven and stopped just before engagement of the driving disk with the coupling member, and then redriven in the same direction.

4 Claims, 9 Drawing Sheets

AUTOMATIC BREAD-MAKING DEVICE

BACKGROUND OF THE INVENTION

The present invention relates to an automatic bread-making device and, more particularly, a device for automatically carrying out a series of steps in a home bread-making process from kneading to baking.

Figure 13:
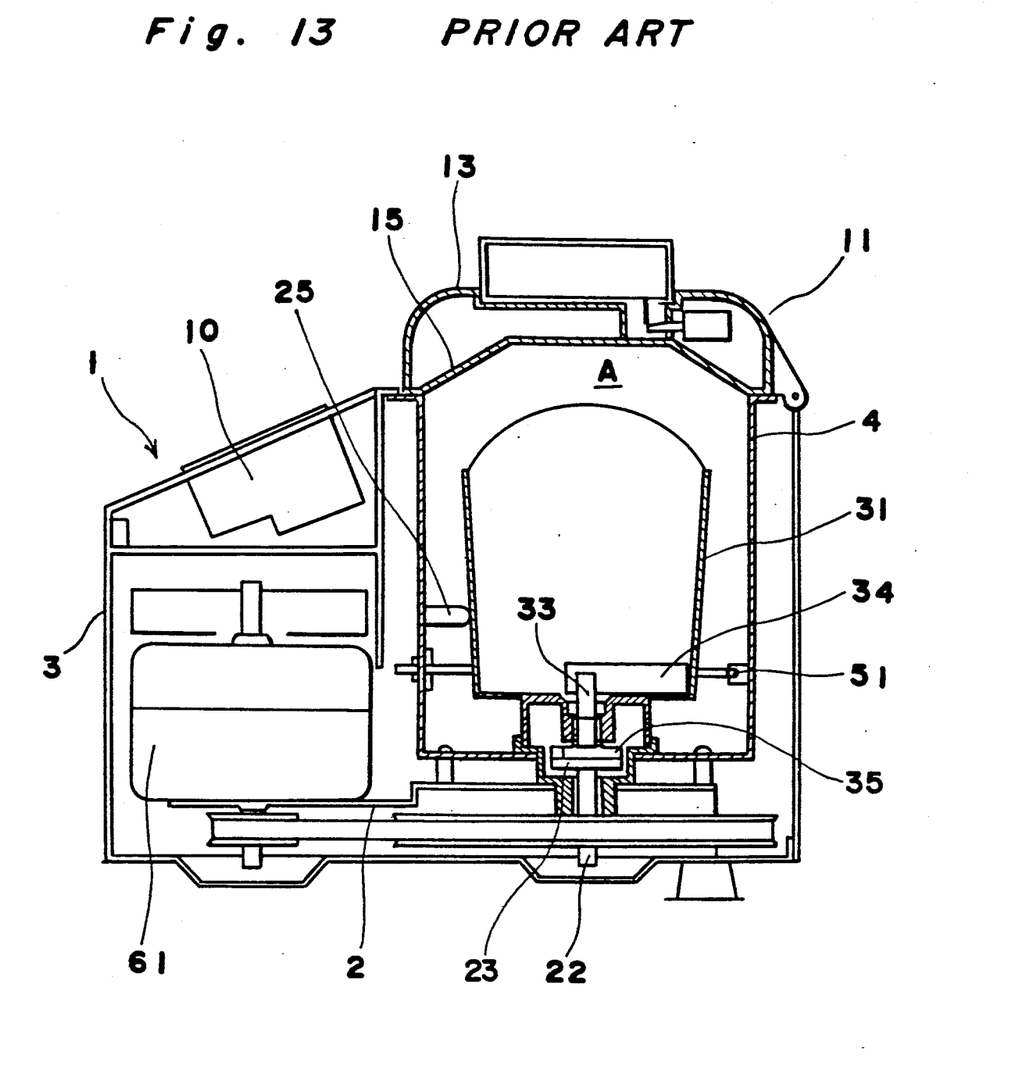
FIG. 13 is a partially cut-away side view of an automatic bread-making device of the prior art.

Recently, such automatic bread-making devices have received practical application and are disclosed in various Japanese Patent and Utility model applications, for example, in laid open Patent No. 63-3820 and laid open Utility model No. 63-153937. Such an automatic bread-making device generally comprises, as shown in FIG. 13, a housing 1 with a baking chamber A, a cooking vessel 31 removably arranged in the baking chamber A and provided at its bottom with a rotating shaft 33, a kneading blade 34 removably mounted on the rotating shaft 33, a driving means for rotating the blade 34 through the rotating shaft 33, and a heating means 51 for baking a dough in the vessel 31.

In such a device, all the ingredients such as wheat flour, a leavening agent or yeast, salt and water, which have been manually placed in the cooking vessel 31, are kneaded by the kneading blade which alternately revolves clockwise and counterclockwise, and the resultant dough is leavened, kneaded again to remove gas in the dough, leavened again to form it into a shape and then baked to complete production of bread. All these bread-making steps are automatically carried out by means of a sequence control system which controls the driving means and heating means in programmed sequence. The task for an operator is to push a start switch after placing all the ingredients in the cooking vessel, thus making it possible to produce bread at home with ease.

However, the above bread-making device has some problems awaiting a solution. For example, the rotating shaft on which the kneading blade is put comprises generally a semicircular cross section, and the blade is held in position on the shaft by friction between them. Thus, if the dough adheres to the blade, it is caught by the blade and forced into a gap between the blade and the bottom of the vessel, thereby producing an upwardly acting force on the blade. As a result, the blade is pushed up and then slipped out of position during kneading. This phenomenon occurs easily when the amount of the dough to be kneaded is small, for example, 0.5 pounds or less.

This problem may be solved to some extent by coating the blade with a fluoroplastic to prevent the dough from adhering to the blade. However, it is required to insert a suitable masking means such as pins into a bore of the blade to prevent the contacting surface of the blade from being coated with the fluoroplastic as the fluoroplastic considerably reduces frictional resistance between the blade and the rotating shaft. Thus, the use of the masking means results in a decrease in efficiency of coating operations.

Another solution is to increase the roughness of the contacting surfaces of the blade and the rotating shaft to increase the frictional force between them. However, this requires machining of the kneading blade, resulting in decrease of productivity. In addition, such roughend surfaces of the blade and shaft allow the dough to enter into the contacting surface between them, thus making it difficult to remove the blade from the shaft as the blade and rotating shaft are put together by burnt crumbs produced between them during baking.

Another problem is that the bread-making device produces impact sounds every time the revolution of the blade is reversed during kneading as the rotating shaft is coupled to a driving shaft by a coupling means composed of a coupling member 35 with a pair of arms mounted on the rotating shaft 33, and a driving disk 23 with a pair of diametrical pins or projections mounted on the driving shaft 22.

Further, it is impossible with the conventional automatic bread-making device to produce well-baked bread through all seasons as the leavening is greatly affected by the surrounding temperature. If the device is operated at a surrounding temperature of 28° C. and above as in summer, the consumption of sugar in the dough is increased by an increase of the activity of yeast, resulting in production of underbaked bread.

SUMMARY OF THE INVENTION

It is therefore an object of the present invention to provide an automatic bread-making device of the kind wherein a kneading blade is prevented from slipping out of position during kneading.

Another object of the present invention is to provide an automatic bread-making device which is free from impact sounds during kneading.

According to one aspect of the invention an improved structure for attachment of a kneading blade to a rotating shaft is provided, wherein the kneading blade is provided with at least one crescent-shaped projection at a wall surface of a bore for attachment of the blade to the rotating shaft, and wherein the rotating shaft is provided at its upper portion with at least one groove extending in the direction parallel to a line which intersects the axis of the shaft to form a head with a figure similar to that of an opening formed between the inner wall of the bore and a free end of the projection, the kneading blade being attached to the rotating shaft so that the head of the rotating shaft is engaged with the projection of the blade when the head of the shaft is arranged in the bore of the blade.

In a preferred embodiment, the kneading blade is provided at the inner surface of the bore with two crescent-shaped projection shafts opposed at their parallel end surfaces, and the rotating shaft is provided at its upper portion with two grooves extending parallel in the direction parallel to a line which intersects the axis of the shaft to form a head with a T-shaped vertical cross section and a figure similar to that of an opening formed between the inner surface of the bore and parallel end surfaces of the projections.

The kneading blade may be attached by placing it on the rotating shaft and then forcing it downwardly until the bottom surface of the projection comes in contact with the grooved top of the rotating shaft. When the rotating shaft is driven by the driving means, the head of the rotating shaft is engaged at its corners with the projection of the blade so that the kneading blade is prevented from slipping out of position during kneading.

According to another aspect of the invention an improved method is provided for controlling an automatic bread-making device to minimize impact sounds caused by the coupling means between the rotating shaft and the driving shaft during kneading.

According to the present invention, there is provided a method for controlling an automatic bread-making device of the kind wherein a rotating shaft is removably connected to a driving shaft through a coupling means composed of a coupling member mounted on the rotating shaft, and a driving disk mounted on the driving shaft so that the disk engages with the coupling member at a position where the driving disk and coupling member revolves clockwise or counterclockwise at a certain degree, the method comprising the steps of reversely driving a driving shaft, stopping the driving shaft just before engagement of the driving disk with the coupling member, and then redriving the driving shaft in the same direction.

An improvement according to the present invention resides in an automatic bread-making device to produce well-baked bread independently of the surrounding temperature. To this end, the last leaving time and baking conditions are so determined on the basis of the surrounding temperature during an initial stage of the last leavening step that the remaining time for the last leavening is shortened as the surrounding temperature rises, and that the baking temperature and baking time are respectively made higher and longer as the surrounding temperature rises.

According to the present invention, there is also provided an automatic bread-making device further comprising a sequence control system for controlling the driving means and cooking heater in sequence, the control system including a temperature detecting element for detecting a temperature of the cooking vessel, means for determining the last leavening time and baking conditions on the basis of the surrounding temperature detected at the initial stage of the last leavening step by the temperature detecting element in such a manner that the remaining time for the last leavening is shortened as the surrounding temperature rises, and that the baking temperature and time are respectively made higher and longer as the surrounding temperature rises.

These and other objects, features and advantages of the present invention will be apparent from the following detailed description with reference to the accompanying drawings which show, by way of example only, preferred embodiments thereof. In these figures, like parts are designated by like reference numerals.

PREFERRED EMBODIMENTS OF THE PRESENT INVENTION

Figure 1:
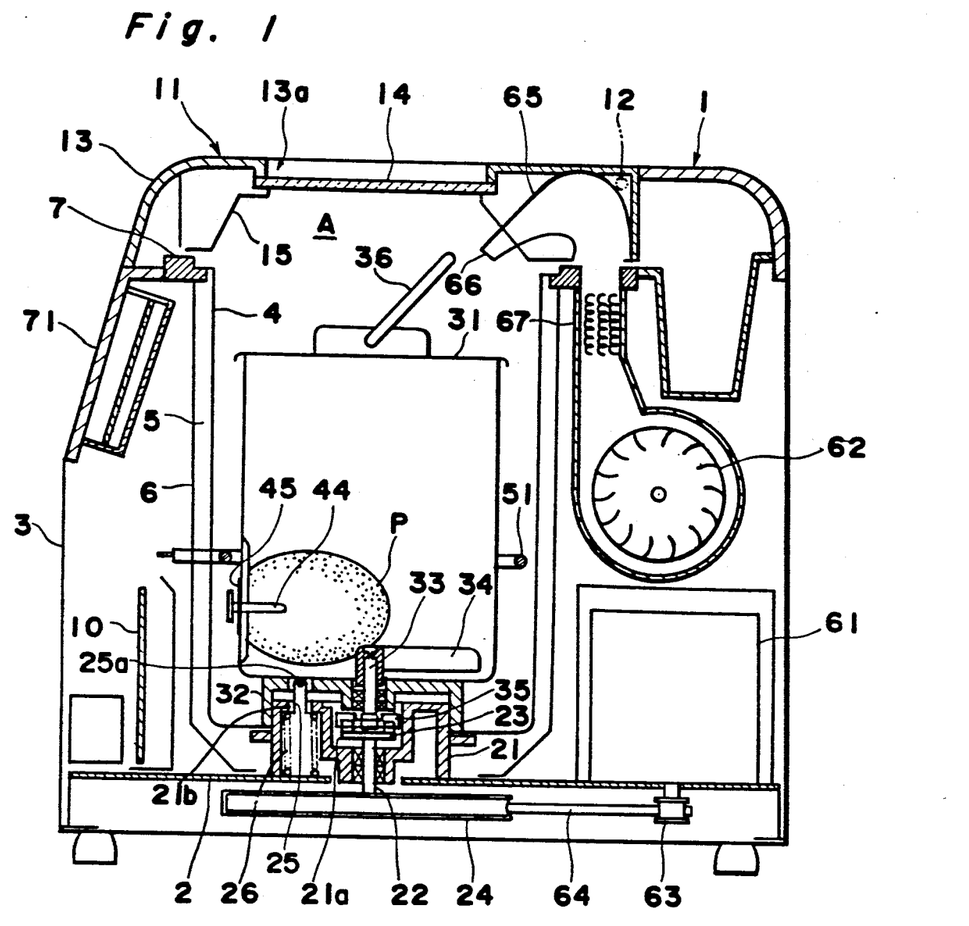
FIG. 1 is a sectional side view of an automatic bread-making device embodying the present invention.

Referring now to FIG. 1, there is shown an automatic bread-making device embodying the present invention, which basically comprises a housing 1 with a baking chamber A, an open-topped cooking vessel 31 removably arranged in the baking chamber A and provided at its bottom with a rotating shaft 33, a kneading blade 34 removably mounted on the rotating shaft 33, a driving means for rotating the kneading blade through the rotating shaft 33, a heater 51 arranged in the baking chamber A for heating the vessel 31, and a sequence control system 10 for controlling the driving means and heater in sequence.

The housing 1 comprises a barrel 3 with a chassis 2, an oven casing 4 arranged in the barrel 3 to form the baking chamber A, a shoulder member 7 mounted on the top of the barrel 3, and a lid 11 pivotally and removably mounted on the barrel 3 by a pair of pins 12. The oven casing 4 is mounted on the shoulder member 7 and surrounded by a heat insulating member 6 spaced therefrom to form a thermal insulating layer between the casing 4 and the heat insulating member 6.

The lid 11 comprises an outer lid member 13 of a synthetic resin with an opening 13a, and an inner lid member 15 of stainless steel with an opening to prevent the outer lid member 13 from being heated by radiation and convection of heat. A heat resisting glass 14 is put in the opening 13a to allow the operator to peep into the interior of the cooking vessel 31.

The chassis 2 is provided with a mount 21 so that it extends into the baking chamber A through an opening formed in the bottom of the oven casing 4. The mount 21 is provided at its top wall with a cylindrical recess 21a to form a housing for coupling means. The driving shaft 22 is mounted at a central portion of the recess 21a and connected at its lower end to a motor 61 through a belt drive mechanism, where a belt 64 passes over two pulleys 24 and 63 fixed to the driving shaft 22 and motor shaft 61a, respectively. The mount 21 is provided at its top wall with a through hole 21b, through which a temperature probe 25 is forced upwardly by means of a coil spring 26 arranged between the probe 25 and chassis 2, so that the probe 25 may be in contact with the bottom of the cooking vessel 31 when the vessel 31 is placed on the mount 21. The temperature probe 25 includes a temperature detecting element such as a thermistor 25a attached to the top of the probe 25.

The cooking vessel 31, a square-shaped container with rounded corners, is provided at its bottom with a locating member 32. The rotating shaft 33 for attachment of the kneading blade 34 is rotatably mounted at a central portion of the locating member 32. An upper part of the rotating shaft 33 extends into the cooking vessel 31 through its bottom and the kneading blade 34 is removably attached to the rotating shaft 33. A lower part of the shaft 33 extends into the recess 21a of the mount 21 and is provided with a coupling member 35 with a pair of arms 35a and 35b adapted to be engaged with a pair of pins or projections of a driving disk 23 mounted on the driving shaft 22 mentioned below.

The cooking vessel 31 is provided at its side wall with a kneading rod 44 extending horizontally along a line which intersects the vertical center axis of the vessel 31 at a right angle. This kneading rod 44 is attached to the vessel 31 by a fixing member 45 to prevent the dough P from being rotated with the kneading blade 34 during kneading, but it is removed from the vessel 31 when taking out the produced bread from the vessel 31. The provision of the kneading rod improves the efficiency of kneading.

A circular sheathed heater 51 is arranged around the cooking vessel 31 to heat the dough P in the vessel.

Figures 2, 3, 5:
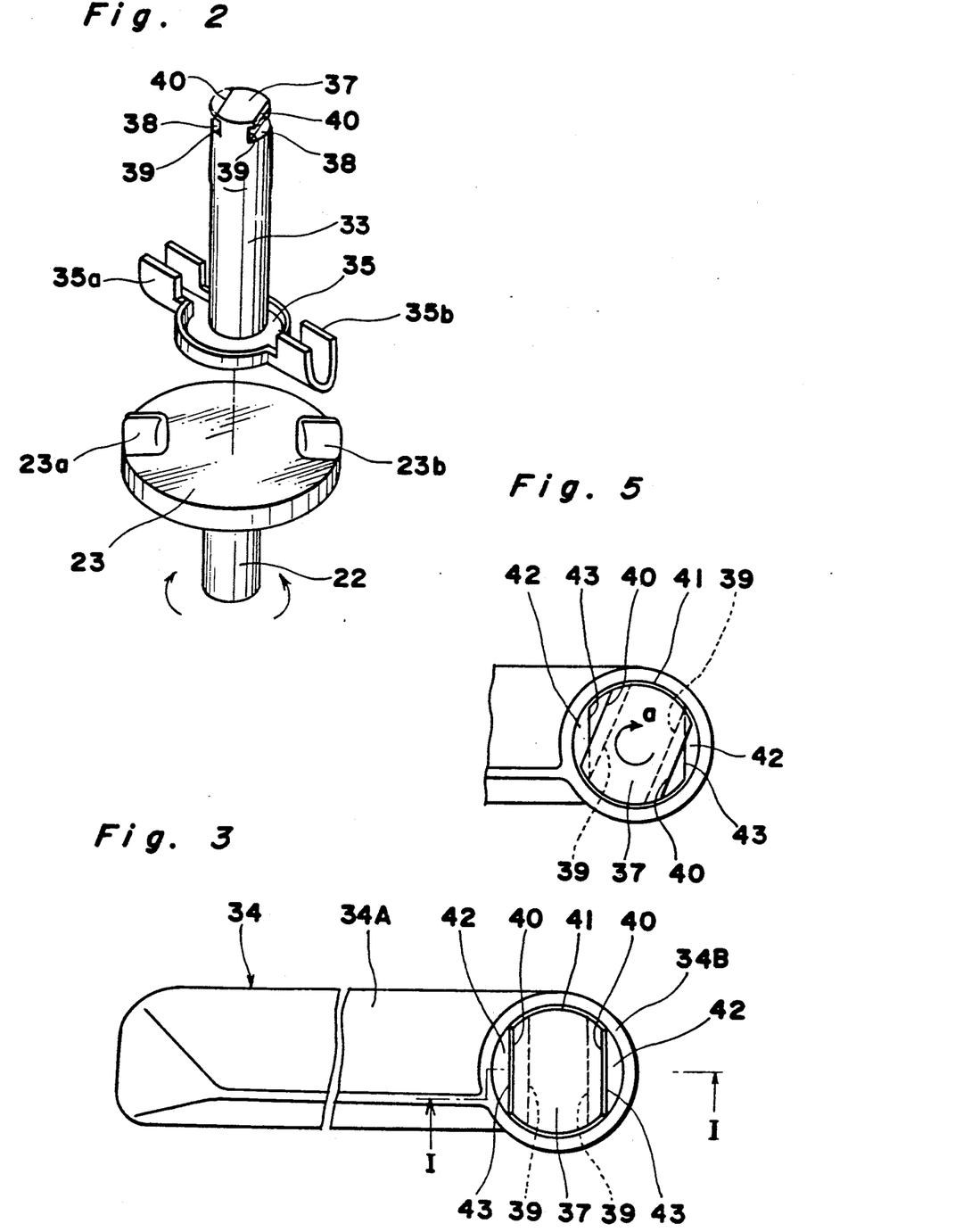
FIG. 2 is an exploded perspective view showing a coupling means between a rotating shaft and a driving shaft used in the device of FIG. 1.
FIG. 3 is a top view of the rotating shaft with the kneading blade shown in FIG. 2.
FIG. 5 is a top view of the rotating shaft with the kneading blade, illustrating engagement between them.

As illustrated in FIG. 2, the rotating shaft 33 is provided at its upper portion with parallel grooves 38 to form a head 37 with a T-shaped vertical cross section. The head 37 is partially cut along lines parallel to a line, which intersects the axis of the shaft 33 at right angles, so as to have a figure bounded by opposed arcs and parallel straight lines which joins the ends of the opposed arcs. The grooves 38 extend in the direction parallel to a line which intersects the axis of the rotating shaft 33 at right angles, so that the bottom surfaces 39 of the grooves 38 are parallel with each other and that the grooves 38 are symmetrical about the axis of the shaft 33. The bottom surfaces 39 are parallel with a plane passing through each cut surface 40 of the head 37.

Figure 4:
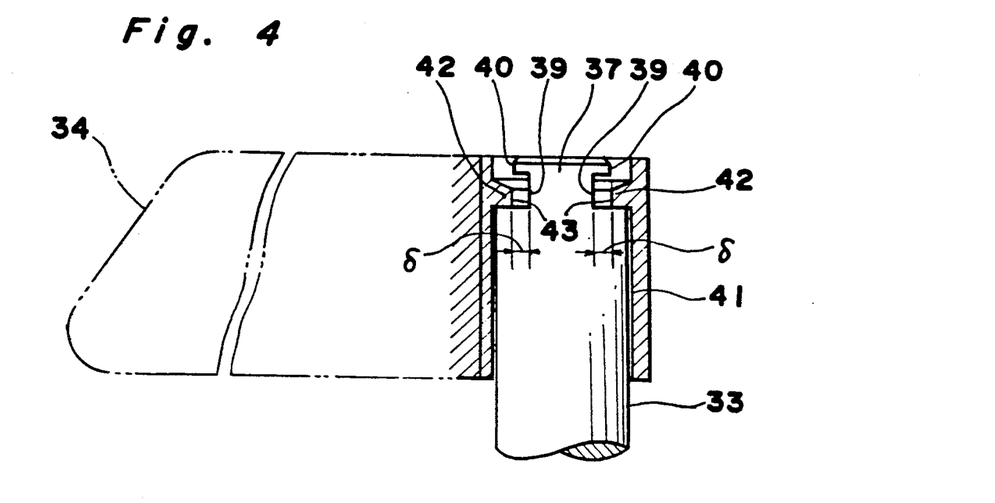
FIG. 4 is a cross section of the rotating shaft with the kneading blade, taken along lines I—I of FIG. 3.

The kneading blade 34 with a triangular cross section is provided at its one end with a hollow cylindrical portion 34B as an integral part thereof to form a bore 41 for attachment to the rotating shaft 33. In accordance with the present invention, the blade 34 has two crescent-shaped projections 42 which extend inwardly from the inner surface of the bore 41 to form an oblong opening with rounded corners, as shown in FIGS. 3 to 5. The projections 42 are diametrically arranged on the inner wall of the bore 41 and opposed to each other at their parallel end surfaces 43. Thus, the projections 42 are symmetrical about the axis of the bore 41. A distance between their opposed parallel surfaces 43 is slightly greater than that between the surfaces 40 of the shaft head 37 so that the head 37 of the rotating shaft 33 may pass through the oblong opening.

The kneading blade 34 can be attached to the rotating shaft 33 by lining up the side surfaces 43 of the projections 42 with the side surfaces 40 of the shaft head 37 and then placing it on the rotating shaft 33 until it comes to a stop. If the rotating shaft 33 is driven clockwise by the driving shaft 22, it begins to rotate but initially runs idle by an angle corresponding to a gap δ between the groove bottom 39 and the side surfaces 43 of the projections 42 until the bottom edges of the grooves 38 come in contact with the projections 42 of the blade 34 as shown in FIG. 5. Then, the shaft 33 rotates the kneading blade 34 in the direction indicated by an arrow a in FIG. 5. If the rotating shaft 33 is reversed in revolution, the shaft 33 runs idle until the opposite bottom edges of the grooves 38 come in contact with the projections 42, and then rotate the blade 34. During revolution of the blade, the head 37 of the rotating shaft 33 is engaged with the projections at their edges, so that the kneading blade 34 is prevented from slipping off from the shaft 33 even if the dough adheres to the blade and is then forced into the gap between the blade 34 and the bottom of the cooking vessel 31.

Figure 6:
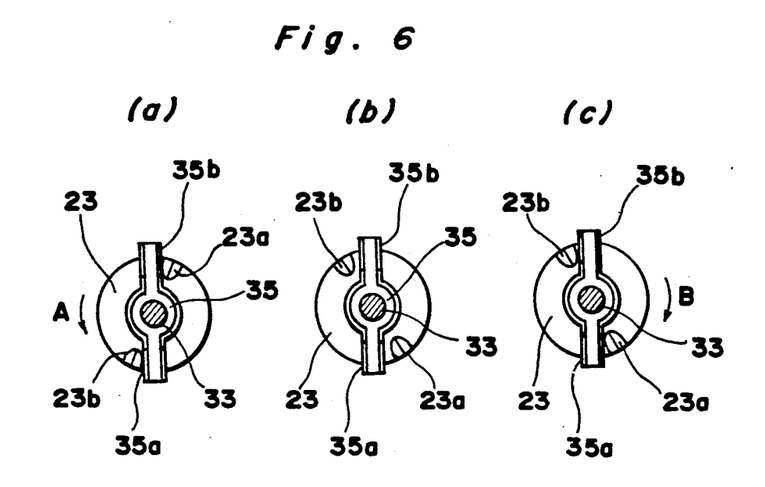
FIG. 6 is a top view of a coupling means used in the device of FIG. 1.

As shown in FIG. 2, the coupling means is composed of a driving disk 23 mounted on the top of the driving shaft 22, and a coupling member 35 mounted on the lower end of the rotating shaft 33. The driving disk 23 is diametrically provided with a pair of pins or projections 23a and 23b, while the coupling member 35 is diametrically provided with a pair of arms 35a and 35b adapted to be engaged with the projections 23a and 23b. If the driving shaft 22 is driven counterclockwise, the projections 23a and 23b of the driving disk 23 are brought into contact with one side of the arms 35b and 35a as shown in FIG. 6a to drive the rotating shaft 33 in the direction indicated by an arrow A. However, if the revolution of the driving shaft 22 is reversed, the driving disc 23 runs idle about 180° until the projections 23a, 23b of the disk 23 are brought into contact with the arms 35a and 35b at their opposite sides as shown in FIG. 6c. Since clockwise and counterclockwise revolutions are alternately repeated during kneading, the driving disc 23 runs idle about 180° until the projections 23a, 23b of the disk 23 come into contact with the arms 35a and 35b of the coupling member 35 every time the revolution of the disk 23 is reversed. As a result, the projections 23a, 23b collide with the coupling arm, resulting in generation of impact sounds.

To solve such a problem, in accordance with the present invention, the driving shaft 22 is driven, for example, in the following manner. Supposing that the projections 23a and 23b of the driving disk 23 are respectively being brought in contact with the arms 35b and 35a as shown in FIG. 6a, the driving shaft 22 is firstly driven clockwise for a short period of time and then stopped just before the projections 23a and 23b of the driving disk 23 come in contact with the arms 35a and 35b, as shown in FIG. 6b. During revolution of the driving shaft 22, the rotating shaft 33 is held in position. After being stopped, the driving shaft 22 is then driven again clockwise to drive the rotating shaft 33. Thus, the projections 23a and 23b or the driving disk 23 are respectively brought into contact with the arms 35a and 35b, so that the driving shaft 22 is coupled to the rotating shaft 33 by the coupling means to drive the kneading blade. After this, when reversing the revolution of the kneading blade, the driving shaft 22 is stopped as illustrated in FIG. 6c, driven counterclockwise for a short period of time, stopped just before the projections 23a and 23b of the driving disk 23 are respectively brought into contact with the arms 35b and 35a, and then driven counterclockwise again. Thus, the projections 23a and 23b of the driving disk 23 are brought in contact with the arms of the coupling member at a low rate of revolution, thus making it possible to prevent the coupling means from generating impact sounds.

To regulate the temperature of the baking chamber A, an electric fan 62 is arranged in the rear space between the heat insulating wall 6 and the barrel 3. The air in the chamber A is sucked into a duct by the cooling fan 62 and then blown into the chamber A through a blow port 66. An auxiliary heating element 67 is arranged in the duct to heat the circulating air as occasion demands.

The above heater 51 and motors 61 and M are controlled by the control system 10 arranged in a front space formed between the housing 1 and heat insulating plate 6. An instruction and control panel 71 is arranged on the upper front part of the barrel 3.

Figure 8:
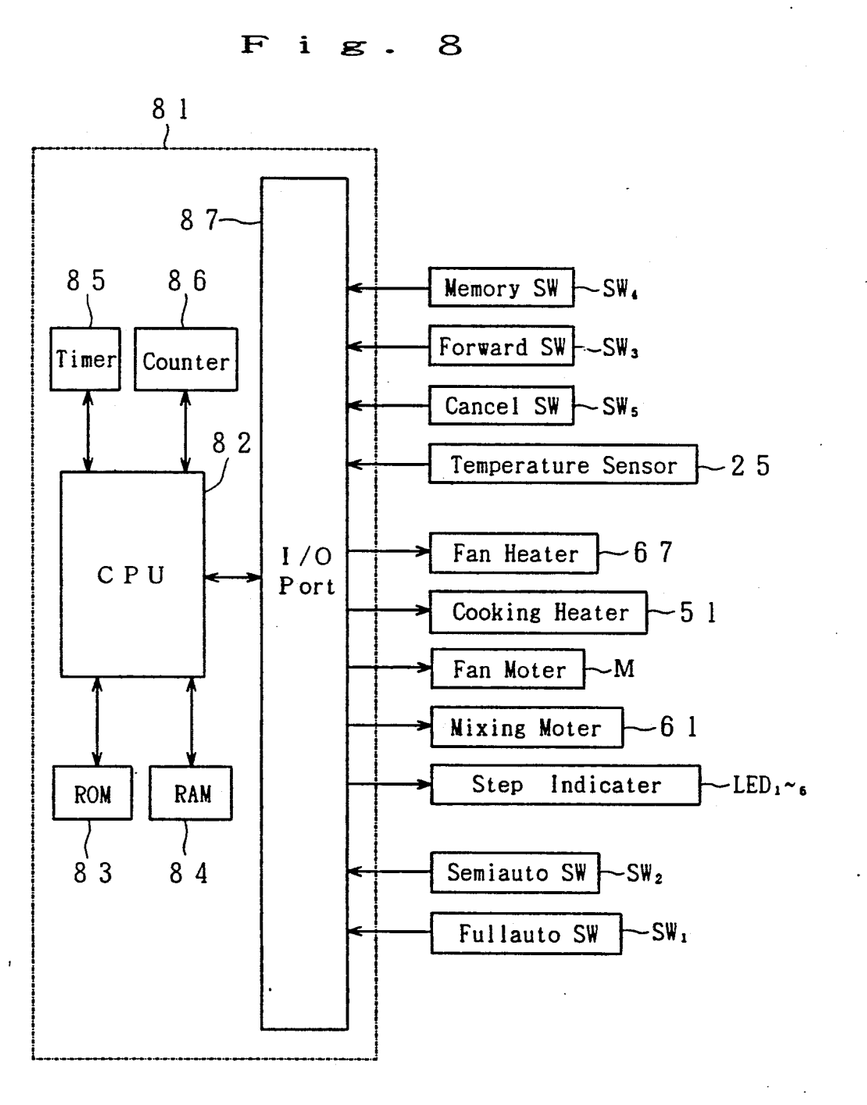
FIG. 8 is a block diagram of the control system of FIG. 7.

The control system 10 comprises a microcomputer 81 including an central processing unit (hereinafter referred to as CPU) 82, a read only memory (ROM) 83 for storing a microcomputer control program and data, a random access memory (RAM) 84, a timer 85, a counter 86, and an input-output port (I/O port) 87, as shown in FIG. 8.

Figure 7:
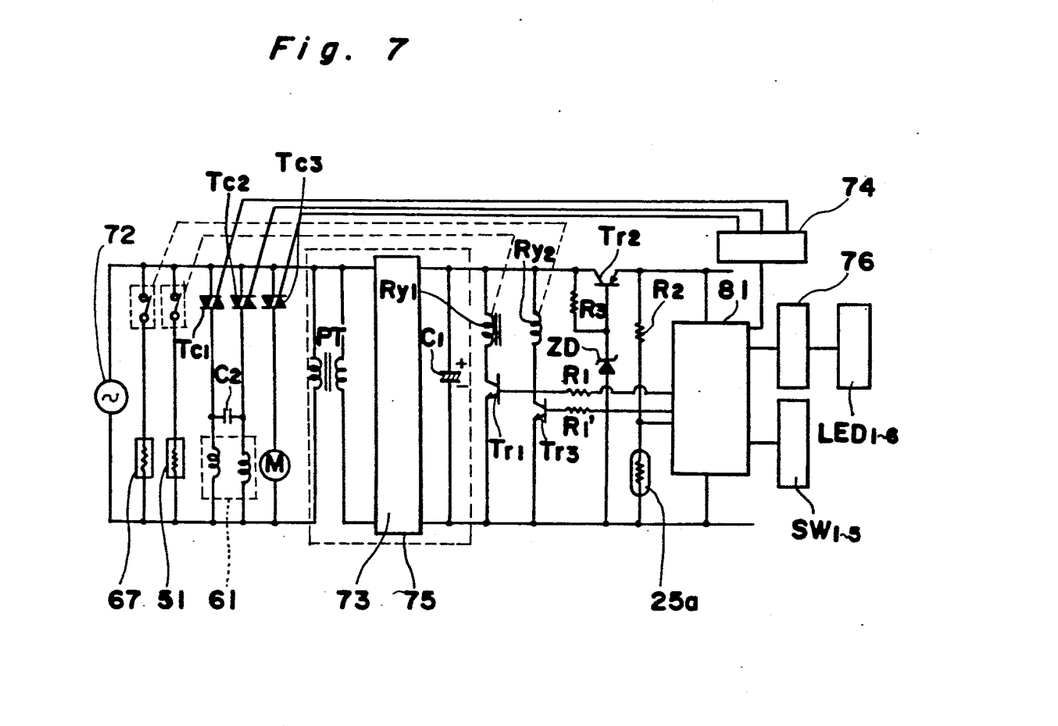
FIG. 7 is a diagram showing an electronic circuit of a sequence control system used in the automatic bread-making device of FIG. 1.

As illustrated in FIG. 7, the cooking heater 51 is connected to an AC power source 72 through normally opened contacts of relays $Ry_1$, of which a coil is connected to a direct current power source 75 through a driver transistor $Tr_1$ connected to the I/O port of the microcomputer 81 through a resistor $R_1$. The transistor $Tr_1$ is turned on by a signal from the microcomputer 81 through its I/O ports to close the contacts of the relay $Ry_1$. Similarly, an auxiliary heater 67 is connected to the AC power source through contact points of a relay $Ry_2$ driven by the microcomputer 81 through a driver transistor $Tr_3$.

The kneading motor 61 is connected to the AC power source 72 through a set of triacs $TC_1$ and $TC_2$. The triacs $TC_1$ and $TC_2$ are alternatively triggered by signals from a driving circuit 74 connected to the microcomputer 81 so that the motor 61 may rotate clockwise or counterclockwise. The fan motor M is connected to the AC power source 72 through a triac $TC_3$, which is triggered by signals from the driver circuit 74 connected to the I/O port of the microcomputer 81.

The control system 10 further includes a voltage stabilizing circuit. The DC power source 75 comprises a power transformer PT, a bridged diode element 73 and a capacitor $C_1$. The voltage stabilizing circuit is composed of a transistor $Tr_2$, a resistor $R_3$ and a zener diode ZD.

To detect a temperature of a dough or that of the cooking vessel 31, a thermistor 25a is connected to the voltage stabilizing circuit through a resistor $R_2$ and to the I/O port of the microcomputer 81. The change in resistance of the thermistor 25a is converted to a voltage and introduced into the microcomputer 81 where the voltage corresponding to the detected temperature is compared with predetermined voltages by a comparator in the microcomputer 81 to determine the temperature of the dough or vessel 31.

The control system 10 also includes a group of switches including operation mode select switches $SW_{1-4}$ and a cancel switch $SW_5$, a group of step indicating elements such as light emitting diode $LED_{1-6}$, all of which are arranged on the indicating and operating panel 71. As shown in FIG. 7, the switches $SW_{1-5}$ are directly connected to the I/O port of the microcomputer 81, while the indicating elements $LED_{1-6}$ are connected thereto through a driver circuit 76. The operation step indicators indicate the operating conditions of the bread-making device.

The mixing motor 61, fan motor M, cooking heater 51 and auxiliary heater 67 are automatically controlled by a program stored in the ROM 83 of the control system 10 to carry out a series of entire steps in the bread-making process. This process comprises the steps of preheating, first kneading, first leavening, second kneading, second leavening, rounding, third leavening, baking, and then cooling, as shown in FIG. 10.

The control operation of the thus constructed bread-making device will be explained with reference to FIGS. 8 to 12 of the accompanying drawings.

In use, home-baked bread is made in the following manner: Firstly, a suitable amount of yeast is put into the cooking vessel 31, and then other solid or powder ingredients such as wheat flour, sugar and the like are put into the vessel 31 so as to cover the yeast. Then, a required amount of liquid, usually water is poured into the vessel so that the yeast and water are separated from one another by the powder ingredients positioned between them. Because, if the yeast comes into contact with cold water, its function is considerably decreased, resulting in failure to perform sufficient leavening of a dough.

Figure 9:
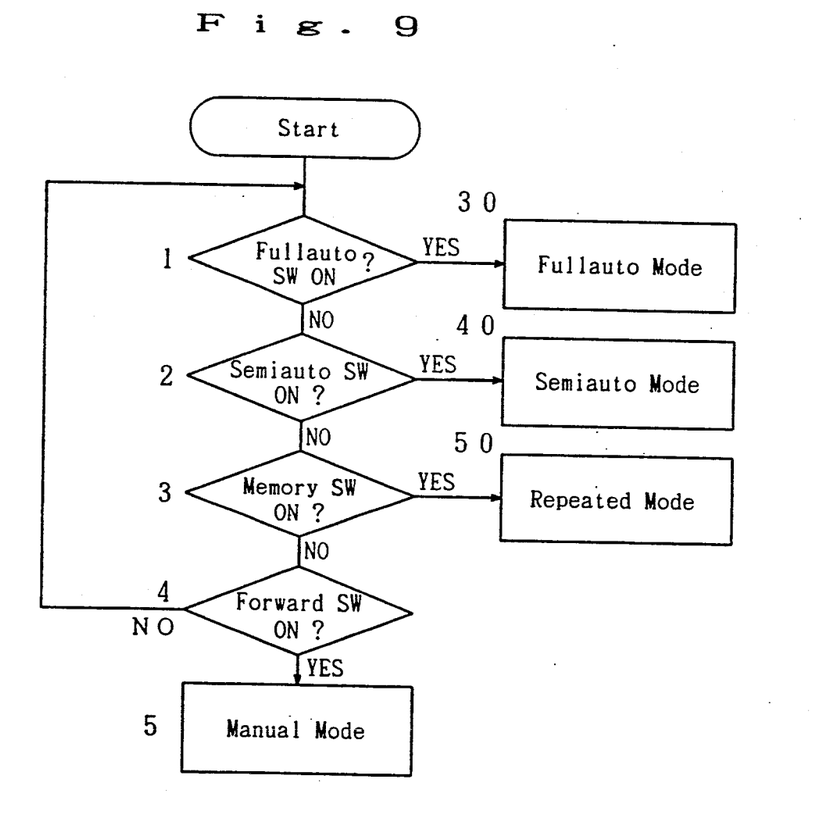
FIG. 9 is a diagram showing a flow chart for determination of an operation mode.
Figure 10:
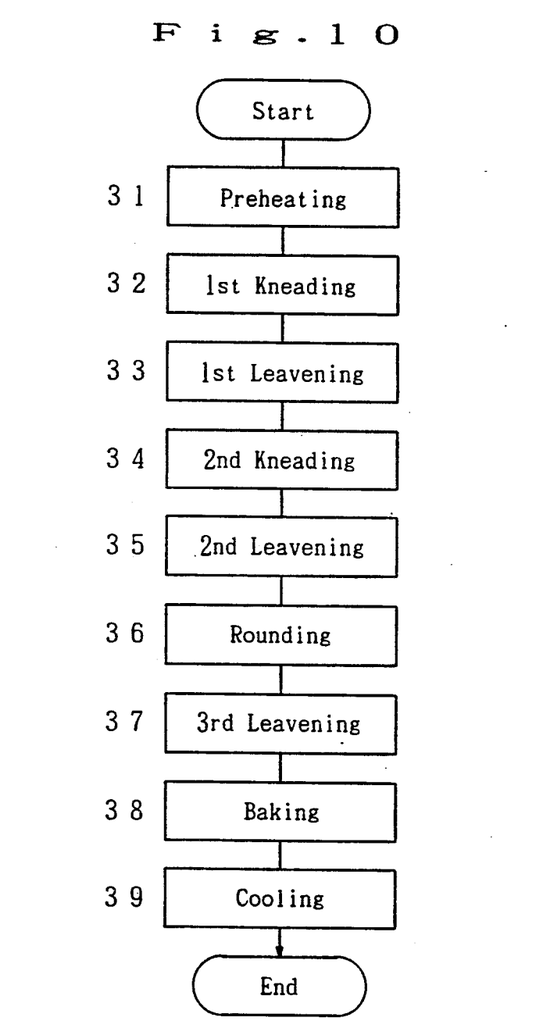
FIG. 10 is a diagram showing a flow chart for entire bread-making steps.

Under such conditions, a power switch is pressed to start the bread-making steps as shown in FIG. 10. By turning on the power, a decision is firstly made at step 1 as to whether or not the fully automated operation mode select switch $SW_1$ (hereinafter referred to as an "fullauto switch") is pressed, as shown in FIG. 9. If the fullauto switch $SW_1$ is pressed, the program jumps to step 30 to enter the fully automated operation mode. If the fullauto switch $SW_1$ is not pressed, the program proceeds to step 2, where a similar decision is made as to whether or not the semiautomated operation mode select switch $SW_2$ (hereinafter referred to as a "semiauto switch") is pressed. If the semiauto switch $SW_2$ is pressed, the program jumps to step 40 to enter the semiautomated operation mode. If the semiauto switch $SW_2$ is not pressed, the program proceeds to step 3, where a decision is made as to whether or not the repeated operation mode select switch $SW_4$ (hereinafter referred to as a "memory switch") is pressed. If the memory switch $SW_4$ is pressed, the program proceeds to step 50 immediately to enter the repeated operation mode, and the device is controlled by a program, which has been stored in the RAM after operating the bread-making device in the manual operation mode. If the memory switch $SW_4$ is not pressed, the program proceeds to step 4.

At step 4, a decision is made as to whether or not the manual operation mode select switch $SW_3$ (hereinafter referred to as a "forward switch") is pressed. If the forward switch $SW_3$ is not pressed, the program returns to step 1. Thus, the decision will be made repeatedly until any one of the mode select switches $SW_1$ to $SW_4$ is pressed.

Here, supposing that the fullauto switch $SW_1$ is pressed, the device is automatically controlled by a program stored in the ROM of the microcomputer 81. In this mode, a temperature of the cooking vessel 31 is firstly detected by the thermistor 25a and compared with a predetermined temperature, for example, 25° C. If the detected temperature is lower than the predetermined temperature, the program proceeds to step 31 where the microcomputer 81 turns on the driver transistor $Tr_1$ to energize the relay $Ry_1$. The contacts of the relay $Ry_1$ closes and applies the AC voltage to the cooking heater 51 to preheat the ingredients before mixing, to avoid extinction of yeast. The cooking vessel 31 is heated to the predetermined temperature by on-off control of the cooking heater 51 until the detected temperature becomes equal to the predetermined temperature, i.e., 25° C.

Figure 11:
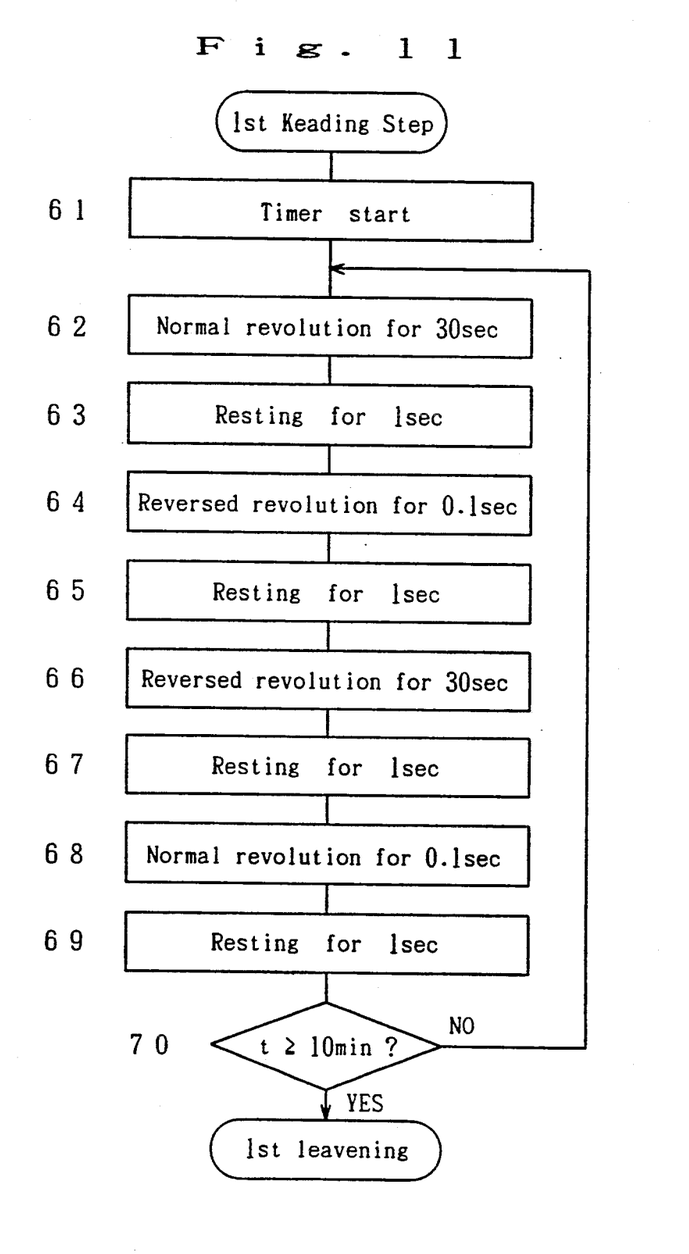
FIG. 11 is a diagram showing a flow chart for the first kneading step in the bread-making steps.

After the temperature of the ingredients has reached the above predetermined value, or if the detected temperature is higher than the predetermined temperature, the program proceeds to step 32 in FIG. 10 and enters into the first kneading step as shown in FIG. 11.

In this first kneading step, the CPU 82 activates the timer 85 (step 61), and then triggers the triac $TC_1$ through the driver circuit 74 to energize the motor 61 (step 62). The motor 61 rotates, for example, counterclockwise for 30 seconds to drive the driving shaft 22 through the pulley 63, belt 64 and pulley 24. The driving shaft 22 runs idle until the driving disk 23 is brought into contact with the arms of the coupling member 35 as shown in FIG. 6a, and then drives the rotating shaft 33 to rotate the kneading blade 34 counterclockwise. At the end of the timed interval, the motor 61 is de-energized, stopped for 1 second (step 63), reversed for 0.1 seconds by switching the applied voltage from one field to the other (step 64), and then stopped for 1 second (step 65). During this period, the driving disk 23 runs idle clockwise by a certain angle, for example, of about 180°, from a state shown in FIG. 6a to a state shown in FIG. 6b. Then, the motor 61 is energized again to rotate the kneading blade clockwise for 30 seconds (step 66). At the end of the timed interval, the motor 61 is de-energized, stopped for 1 second (step 67), reversed again for 0.1 seconds (step 68), and then stopped for 1 second (step 69). After this, the program proceeds to step 70 where a decision is made as to whether or not the time measured by the timer has reached 10 minutes. If the time is less than 10 minutes, the program returns to step 62 and the above steps are repeated until the time exceeds 10 minutes. In this way, the blade 34 is rotated clockwise and counterclockwise alternately during kneading.

After completing the first kneading, the program proceeds to step 33, where the first leavening is carried out. During this first leavening, the microcomputer 81 turns the driver transistor $Tr_1$ on and off which energizes the relay $Ry_1$ to apply or remove the AC voltage to or from the cooking heater 51. This operation is carried out on the basis of the temperature of the cooking vessel 31, or dough temperature detected by the thermistor 25a. Thus, the temperature in the cooking chamber A is maintained to a predetermined value, usually, about 28° C.

After the predetermined time for leavening has passed, the program proceeds to step 34 to enter into the second kneading step. In this step, the kneading is carried out in the same manner as in the first kneading step. The microcomputer 81 triggers the triac $TC_1$ or $TC_2$ alternately through the driver circuit 74 to rotate the mixing motor 61 clockwise or counterclockwise.

After the second kneading, the program proceeds to step 35, where the second leavening is carried out in the same manner as above, and then to step 36, where the rounding of the dough is carried out. The rounding operations are similar to those for the first kneading step except that the kneading blade is rotated clockwise or counterclockwise for a very short time. Then, the program proceeds to step 37 to carry out the third leavening.

Figure 12:
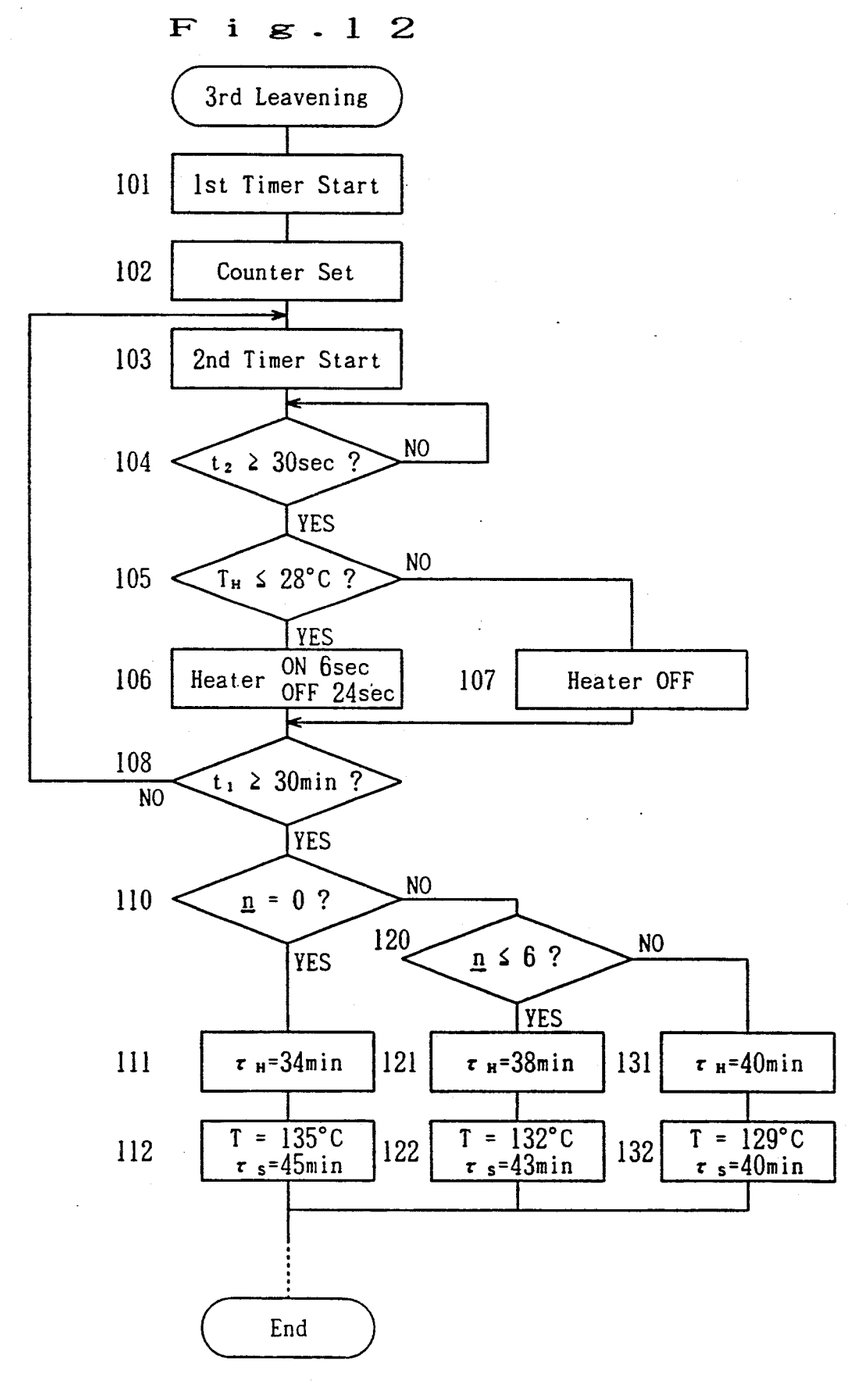
FIG. 12 is a diagram showing a flow chart for the third leavening step in the bread-making process.

During the third leavening step, the time required for the third leavening and baking conditions are determined on the basis of the surrounding temperature of the automatic bread-making device in the following manner.

As illustrated in FIG. 12, the first timer 85 starts work at step 101 to carry out the first stage of the third leavening for a period of 30 minutes, and the counter 86 is set at step 102 to count the number of turning on times of the baking heater 51, i.e., n during that time. Then, the second timer 85 starts work at step 103 to put the program to a pause for a period of 30 seconds. If the time is up, a decision is made at step 105 as to whether or not a temperature of the cooking vessel 31, or a temperature of the dough, $T_H$, which is detected by the thermistor 25a, is not more than 28° C.

If the detected temperature is not more than 28° C., the transistor $Tr_1$ is turned on to energize the relay $Ry_1$. The contacts of the relay $Ry_1$ closes and applies the AC voltage to the cooking heater 51. The transistor $Tr_1$ is then turned off after the lapse of 6 seconds to de-energize the relay $Ry_1$. During this period, the heater 51 is turned on for 6 seconds and turned off for 24 seconds. In this way, the relay $Ry_1$ is energized and de-energized repeatedly to maintain the temperature of the dough P at about 28° C., which is the optimum leavening temperature. If the detected temperature $T_H$ is more than 28° C., the heater 51 is kept off at step 107 and the program proceeds to step 108. These operations are repeated until a decision that a period of 30 minutes has elapsed is made at step 108. If the time is up, the program proceeds to step 110, where a decision is made as to whether or not the number of turning-on times of the heater, i.e., n, is 0.

If n is 0, the program proceeds to step 111, where the timer 85 is set to perform the remaining leavening time, $\tau_H$, for 34 minutes. Then, the program proceeds to step 112 to set the baking temperature (T) and baking time ($\tau_s$) to 135° C. and 45 minutes, respectively. If n is not 0, the program proceeds to step 120, where a decision is made as to whether or not n is a value ranging from 1 to 6. If n takes a value falling within the above range, the program proceeds to step 121, where the remaining leavening time is set to 38 minutes, and then proceeds to step 122. At this step, the baking temperature and time are set to 132° C. and 43 minutes, respectively. If n is not less than 7, the program proceeds to step 131, where the remaining leavening time is set to 40 minutes, and then proceeds to step 132 to set the baking temperature and time to 129° C. and 40 minutes, respectively.

In this way, the remaining leavening time is determined on the basis of the surrounding temperature to carry out the leavening at the optimum conditions. This makes it possible to avoid poor or excess leavening of the dough. Further, the baking conditions are also determined on the basis of the surrounding temperature to produce well baked bread independently of the surrounding temperature. These decisions are made for the reasons that the activity of yeast and the amount of sugars in the dough depend on the surrounding temperature.

After such decisions have been made, the leavening proceeds for the thus determined time. If the time is up, the leavening step is completed and the program proceeds to step 38. At the beginning of step 38, the microcomputer 81 turns on the transistor $Tr_1$ to energize the relay $Ry_1$. The contacts of the relay $Ry_1$ closes and applies the AC voltage to the cooking heater 51, and the baking is carried out under the conditions determined on the basis of the surrounding temperature during the above leavening step.

If the time for baking is up, the program proceeds to step 39 and enters the cooling step. In this mode, the microcomputer 81 turns off the driver transistor $Tr_1$ and de-energizes the relay $Ry_1$. The contacts of the relay open to turn off the heater 7. Then, the microcomputer 81 triggers the triac $TC_3$ through the driver circuit 74 to energize the fan motor M to cool the resulting bread with air.

In the semiautomated mode operation, the device is controlled automatically during the first several steps in the bread-making process, i.e., from the first kneading step to the third leavening step, while the remaining steps must be controlled by the person operating the device. In this case, the operator must monitor the dough to be baked and then push the forward switch when the bread is baked as desired, to transfer the operation of the device from the baking step to the next cooling step.

In the manually operated mode, the bread-making device is basically controlled by a program stored in the ROM, but this program may be modified according to the demand of the person operating the bread-making device. In this case, the program is forcedly proceeded by pushing the forward switch during the predetermined period of time for each operation. Once the device has been operated by the manual mode, the resulting information and data may be stored in the RAM. This information and data can be used for the repeated operation mode of the device and can be canceled by pressing the cancel switch before starting of the operation of the device.

Modifications and variations of the present invention are possible in light of the above teachings. It is, therefore, to be understood that within the scope of the appended claims the invention may be practiced otherwise than as specifically described.

For example, the rotating shaft 33 may have a head with an inverted L-shaped cross section. In this case, the shaft is provided at its upper portion with one groove extending along a line parallel to a line which intersects the axis of the shaft at right angles, and the upper part of the shaft is partially cut away along a line parallel to a plane passing through a bottom plane of the groove, to remove a crescent-shaped part from the disk-shaped head.

What is claimed is:

1. An automatic bread-making device, comprising: a housing with a baking chamber; a cooking vessel removably arranged in said chamber and provided at its bottom with a rotating shaft; a cooking heater arranged in said cooking chamber to heat said vessel; a kneading blade removably attached to said rotating shaft; and a driving means for rotating said kneading blade through the rotating shaft, wherein said kneading blade is provided with a bore for attachment to the rotating shaft, said bore having at least one crescent-shaped projection formed therein, and wherein said rotating shaft is provided at its upper portion with at least one groove extending in the direction parallel to a line which intersects with an axis of the shaft at a right angle to form a head adapted to be engaged with said projection of the blade when said shaft is in revolution, said head being partially cut in such a manner that it may pass through an opening defined by an inner wall of the bore and a free end of said projection.

2. An automatic bread-making device as claimed in claim 1, further comprising: a sequence control system for controlling said driving means and cooking heater in sequence to perform a series of bread-making steps including a first kneading step, a first leavening step, a second kneading step, a second kneading step, a third leavening step, and a baking step of a bread material, said sequence control system including a temperature detecting element for detecting a temperature of the cooking vessel, means for determining a time required for the third leavening step and baking conditions on the basis of the surrounding temperature of the device detected at the initial stage of the third leavening step of said temperature detecting element in such a manner that the remaining time of the third leavening step is shortened as the surrounding temperature of the device rises, and that the baking temperature and time are respectively made higher and longer as the surrounding temperature rises.

3. An automatic bread-making device as claimed in claim 1, wherein said kneading blade is provided with two crescent-shaped projections extending inwardly from an inner surface of the bore to form an oblong opening with rounded corners, and wherein said rotating shaft is provided at its upper portion with two parallel grooves extending in the direction parallel to a line which intersects with an axis of the shaft at right angles to form a head with a T-shaped cross section, said head being partially cut so as to have a shape bound by opposed arcs and parallel straight lines which join the ends of the opposed arcs.

4. An automatic bread-making device as claimed in claim 1, wherein the kneading blade is attached to said rotating shaft in such a manner that said rotating shaft runs idle until a bottom edge of said at least one groove comes in contact with the projection of the blade, every time the direction of rotating of the rotating shaft is reversed.

* * * * *

UNITED STATES PATENT AND TRADEMARK OFFICE
CERTIFICATE OF CORRECTION

PATENT NO. : 5,076,153

DATED : December 31, 1991

INVENTOR(S) : Yoshinori Takahashi et al

It is certified that error appears in the above-identified patent and that said Letters Patent is hereby corrected as shown below:

Claim 2, column 12, line 18, "of" (second occurrence) should be "by".

Claim 2, column 12, line 20, "of" should be "for".

Signed and Sealed this

Seventh Day of September, 1993

*Attest:*

BRUCE LEHMAN

*Attesting Officer*     *Commissioner of Patents and Trademarks*